United States Patent
Kneller et al.

(10) Patent No.: US 10,790,759 B2
(45) Date of Patent: Sep. 29, 2020

(54) DRIVE SYSTEM WITH AN INTERMEDIATE CIRCUIT BUSBAR

(71) Applicant: SEW-EURODRIVE GMBH & CO. KG, Bruchsal (DE)

(72) Inventors: Klaus Kneller, Ubstadt-Weiher (DE); Jürgen Ott, Dettenheim (DE)

(73) Assignee: SEW-EURODRIVE GMBH & CO. KG (DE)

( * ) Notice: Subject to any disclaimer, the term of this patent is extended or adjusted under 35 U.S.C. 154(b) by 0 days.

(21) Appl. No.: 16/095,430

(22) PCT Filed: Mar. 20, 2017

(86) PCT No.: PCT/EP2017/025052
§ 371 (c)(1),
(2) Date: Oct. 22, 2018

(87) PCT Pub. No.: WO2017/182129
PCT Pub. Date: Oct. 26, 2017

(65) Prior Publication Data
US 2019/0140552 A1    May 9, 2019

(30) Foreign Application Priority Data

Apr. 22, 2016    (DE) .................. 10 2016 004 884

(51) Int. Cl.
*H02M 7/00*    (2006.01)
*H02P 27/06*    (2006.01)
(Continued)

(52) U.S. Cl.
CPC ............ *H02M 7/003* (2013.01); *H02G 5/005* (2013.01); *H02P 27/06* (2013.01); *H02M 2001/008* (2013.01)

(58) Field of Classification Search
CPC ................. H02M 7/003; H02M 2001/008; H02G 5/002; H02G 5/005; H02P 27/06
See application file for complete search history.

(56) References Cited

U.S. PATENT DOCUMENTS 5,936,833 A * 8/1999 Grossman ............ H05K 7/1432
361/638
8,193,449 B2   6/2012 Esmaili et al.
(Continued)

FOREIGN PATENT DOCUMENTS

DE         19622895 A1    12/1996
DE     102009028907 A1    4/2010
(Continued)

OTHER PUBLICATIONS

International Preliminary Report on Patentability issued in International Application No. PCT/EP2017/025052, dated Nov. 1, 2018 (8 pages total).
(Continued)

*Primary Examiner* — Adolf D Berhane
(74) *Attorney, Agent, or Firm* — Carter, DeLuca & Farrell LLP

(57) ABSTRACT

A drive system includes an intermediate circuit busbar, the intermediate circuit busbar having at least one first busbar adapter part on which two lug sections, i.e. in particular lug areas, are formed, which are set apart from each other, one of the two lug sections having a larger cross-section, in particular a larger line cross-section, in particular a line cross-section for carrying current, than the other one of the two lug sections.

15 Claims, 4 Drawing Sheets

(51) Int. Cl.
*H02G 5/00* (2006.01)
*H02M 1/00* (2006.01)

(56) References Cited

U.S. PATENT DOCUMENTS

| | | | |
|---|---|---|---|
| 10,021,788 B2 * | 7/2018 | Ullermann | ........... H05K 1/0213 |
| 2008/0202899 A1 | 8/2008 | Radosevich et al. | |
| 2009/0015992 A1 | 1/2009 | Nohara et al. | |
| 2011/0235276 A1 * | 9/2011 | Hentschel | ............ H01L 23/473 |
| | | | 361/699 |
| 2018/0261992 A1 * | 9/2018 | Bower | .................. H01M 2/206 |
| 2018/0269671 A1 * | 9/2018 | Mattmuller | ............ H02G 5/005 |
| 2019/0036461 A1 * | 1/2019 | Bohmer | .............. H01L 23/5223 |

FOREIGN PATENT DOCUMENTS

| | | | | |
|---|---|---|---|---|
| DE | 102012008750 A1 | | 12/2012 | |
| DE | 102014006360 A1 | * | 11/2015 | ......... H01R 12/7088 |
| KR | 101441336 B1 | | 9/2014 | |

OTHER PUBLICATIONS

International Search Report dated Jun. 20, 2017, in International Application No. PCT/EP2017/025052 (English-language translation).

* cited by examiner

DRIVE SYSTEM WITH AN INTERMEDIATE CIRCUIT BUSBAR

FIELD OF THE INVENTION

The invention relates to a drive system having an intermediate circuit busbar.

BACKGROUND INFORMATION

It is generally known that a drive includes an electric motor which is supplied by a converter, the converter having a power rectifier whose DC-side terminal is connected to the intermediate circuit, and a power inverter whose DC-side terminal is connected to the intermediate circuit.

SUMMARY

Example embodiments of the present invention provide a drive system having an intermediate circuit busbar in which the drive system is able to be produced in a cost-effective manner.

According to an example embodiment of the present invention, the drive system includes an intermediate circuit busbar having at least one first busbar adapter part on which two lug sections, i.e. especially lug regions, are formed, which are set apart from each other. One of the two lug sections has a larger cross-section, in particular a line cross-section, in particular a line cross-section for carrying current, than the other one of the two lug sections.

This has the advantage that the drive system is able to be produced in a cost-effective manner. The busbar adapter part may be arranged with two cross-sections so that a first power inverter, which requires a large connected electrical load, is able to be connected, and also a second power inverter, whose required electrical load is smaller. A single part is therefore sufficient to function as an adapter between the section of the intermediate circuit busbar featuring high current intensities and the section of the intermediate circuit busbar featuring lower current intensities.

The intermediate circuit busbar may include a further busbar adapter part on which two lug sections, i.e. especially lug regions, are provided, which are also set apart from each other, one of the two lug sections of the further busbar adapter part having a larger cross-section than the other of the two lug sections of the further busbar adapter part. This offers the advantage that the intermediate circuit busbar also connects power inverters and/or a supply module featuring the same connected load.

Electrical insulation may be provided between the two busbar adapter parts and touches both of them, the two busbar adapter parts, e.g., being set apart from each other. This has the advantage of achieving a low-inductance intermediate circuit busbar. This is because only the insulation is situated between the two busbar adapter parts, a first one conducting the upper intermediate-circuit potential and the other conducting the lower intermediate-circuit potential. A very close spatial proximity of the two busbar adapter parts is therefore able to be achieved so that a high capacitance is provided as well. This makes it possible to achieve a low-inductance intermediate circuit busbar.

The first and/or the further busbar adapter part may be arranged in the form of a plate such that the clearance between the first and the further busbar adapter part is smaller, in particular at least ten times or even one hundred times smaller than its extension in the transverse direction, which, e.g., is oriented perpendicular to the connection line between the lug sections of the first and the further busbar adapter part and perpendicular to the clearance direction between the first and the further busbar adapter part, i.e. the connection line defined by the smallest clearance between the two parts. This is considered advantageous inasmuch as the clearance between the two busbar adapter parts may be very small, in particular when compared to the width of the busbar adapter part, in particular in the transverse direction.

Each lug section may have a continuous recess for connection screws. This offers the advantage of allowing for the use of a simple and cost-effective connection technology.

The intermediate circuit busbar, i.e. the insulation and each busbar adapter part, may have a continuous recess through which a dome section of a support part projects, which is connected to a housing part of the drive system, in particular to a housing part of an axle module of the drive system, in particular, a cover part, which is situated on the side of the intermediate circuit busbar facing away from the housing part, being connected to the dome section. This has the advantage of allowing for an uncomplicated attachment of an insulating cover insofar as the cover part may be produced from an electrically insulating plastic material. In the same manner, the dome section is able to be produced from such a material. As a result, protection against contact may be obtained for the intermediate circuit busbar with the aid of the cover part.

The drive system may have a supply module, a first and a second axle module, the axle modules may be supplied by the supply module, in particular with a unipolar current, by the intermediate circuit busbar, the first axle module may be connected to the intermediate circuit busbar with the aid of a first electrical line, in particular a supply line, and the second axle module may be connected to the intermediate circuit busbar with the aid of a second electrical line, in particular a supply line, the first electrical line having a larger line cross-section than the second electrical line. This offers the advantage that the busbar adapter part allows for a transition from the region of the intermediate circuit busbar featuring a high current intensity to a region of the intermediate circuit busbar featuring a lower current intensity.

The supply module may have a power rectifier or AC/DC converter whose DC-side terminal is connected to the intermediate circuit busbar, the first axle module may have a first power inverter, and the second axle module may have a second power inverter, the first power inverter, for example, having a greater maximum power output than the second power inverter. This offers the advantage that the supply module supplies a DC voltage, which therefore means that the axle modules are able to be supplied with a DC voltage—either by the supply module or by an axle module operating in a generator mode.

The intermediate circuit busbar may have busbars for the electrical connection of the supply module to the first axle module, and lug sections, which are set apart from one another, may be formed on each busbar, the lug sections having the same cross-section, in particular a line cross-section and in particular, a line cross-section for carrying current in each case. This offers the advantage that the intermediate circuit busbar is able to be obtained as a function of the required current.

The cross-section, in particular the line cross-section, and in particular the line cross-section for carrying current, may be the smallest line cross-section used for carrying current in each case.

One or more axle module(s) may have energy feedback capabilities, which, for example, means that in a generator operation of the electric motor supplied by the respective power inverter, electrical power is able to be conducted to the supply module and/or to another axle module via the intermediate circuit busbar. This is considered advantageous insofar as less energy has to be fed back into the power system and lower losses occur as a result.

Further features and aspects of example embodiments of the present invention are described in greater detail below with reference to the Figures.

DETAILED DESCRIPTION

As illustrated in the Figures, example embodiments of the present invention provide a drive system having an intermediate circuit busbar.

Figure 1:
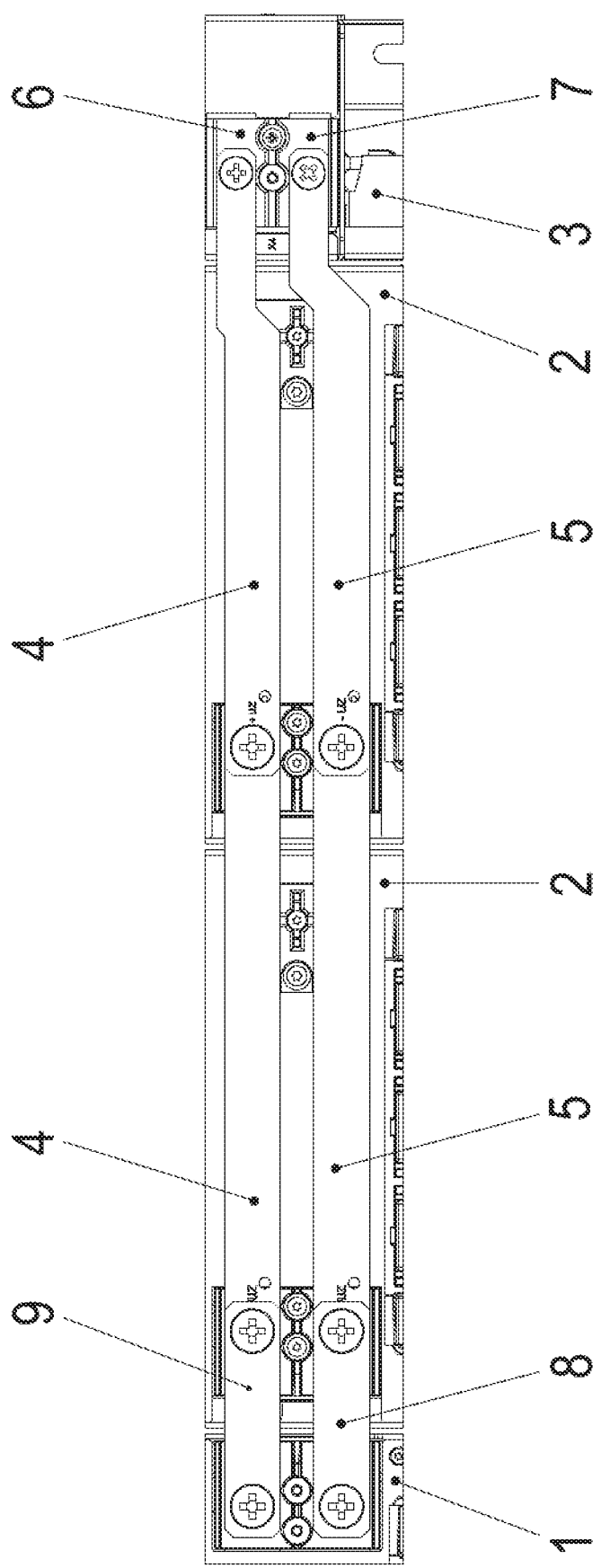
FIG. 1 shows an intermediate circuit busbar for a drive system, the busbars (4, 5, 6, 7, 8, 9) having the same cross-section.

FIG. 1 shows a drive system, which includes a supply module 1, two first axle modules 2, and a second axle module 3. Supply module 1 includes a power rectifier, which is supplied by an AC network and whose DC-side terminals are connected to the axle modules (2, 3) with the aid of an intermediate circuit busbar. First axle modules 2 may include power inverters, each supplying an electric motor. As a result, the rotational frequency and/or the torque of the respective electric motor is/are able to be controlled with the aid of the power inverter.

The intermediate circuit busbar allows for an exchange of energy between the modules. If supply module 1 is adapted to include a feedback unit, it is even possible to feed back energy from the intermediate circuit to the AC network.

The respective first axle module 2 is provided for a greater power consumption than second axle module 3. As a result, the current consumed by first axle module 2 is also greater than the current consumed by second axle module 3.

The intermediate circuit busbar has two busbars (4, 5), which are provided from supply module 1 to the first of the two first axle modules 2. The same busbars (4, 5) are also provided for the electrical connection of the two first axle modules 2. The cross-section of the two busbars (4, 5) is therefore identical in each case.

Busbars (6, 7) that have a smaller cross-section than busbars (4, 5), are provided for the electrical connection between the second of the first axle modules 2 and second axle module 3. As a result, only a smaller current component is able to be conveyed to second axle module 3.

The inductance of this intermediate circuit busbar is not negligible because the two busbars (4, 5, 6, 7) are disposed parallel to one another in each case, are set apart from one another, and the absolute amounts of the currents flowing therein are identical but the current directions of the currents flowing inside are opposed. In addition, the two busbars allocated to each other in each case (4, 5 or 6, 7) have a potential of different magnitude, i.e. the respective upper and the respective lower intermediate circuit potential.

Figure 2:
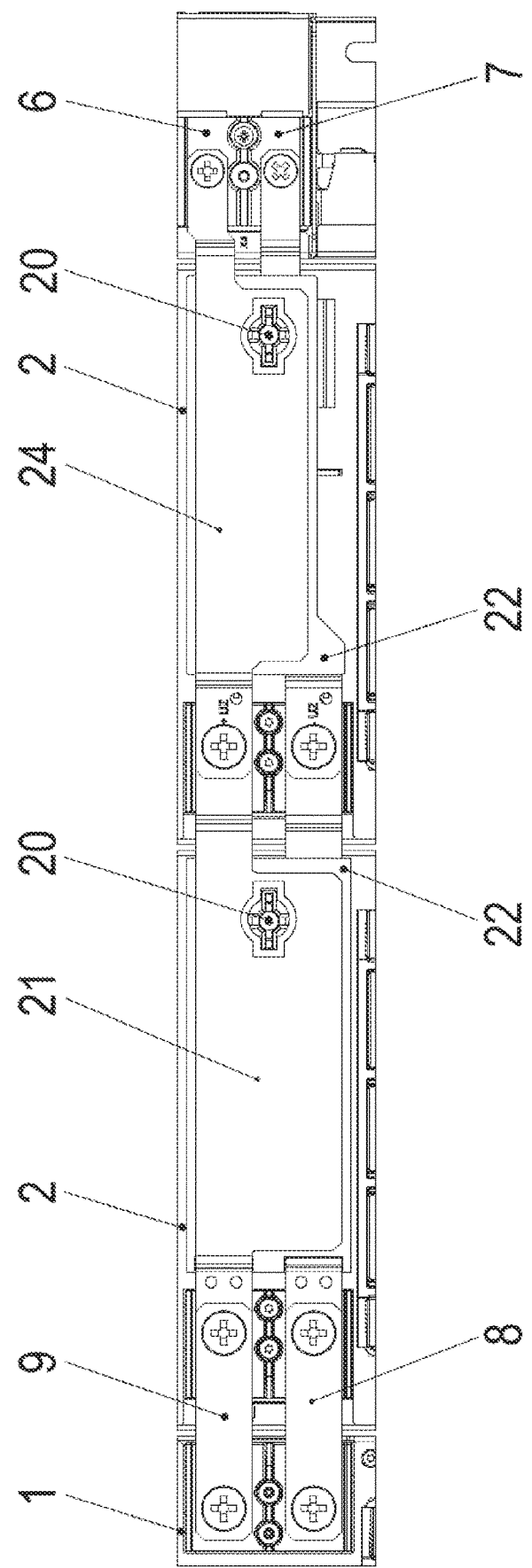
FIG. 2 shows an intermediate circuit busbar according to an example embodiment of the present invention, which, in contrast to FIG. 1, has different cross-sections.

As illustrated in FIG. 2, the intermediate circuit busbar is adapted for a low inductance in this instance. For this purpose, the busbars are arranged as an upper and a lower plate-shaped busbar part 21, and a plate-shaped insulation part 22, i.e. in particular a busbar plate part, is interposed.

Both busbar parts 21 are in contact with insulation part 22. First busbar part 21 touches insulation part 22 on a first side of insulation part 22, and the other busbar part 21 touches insulation part 22 on the other side of insulation part 22.

Due to the plate-shaped arrangement, i.e. the greater extension of busbar parts 21 and insulation part 22 in the transverse direction relative to the busbar direction of busbars 21 in comparison with the spacing of the two insulation parts 22 from each other, a very low-inductance intermediate circuit busbar is achieved.

Figure 3:
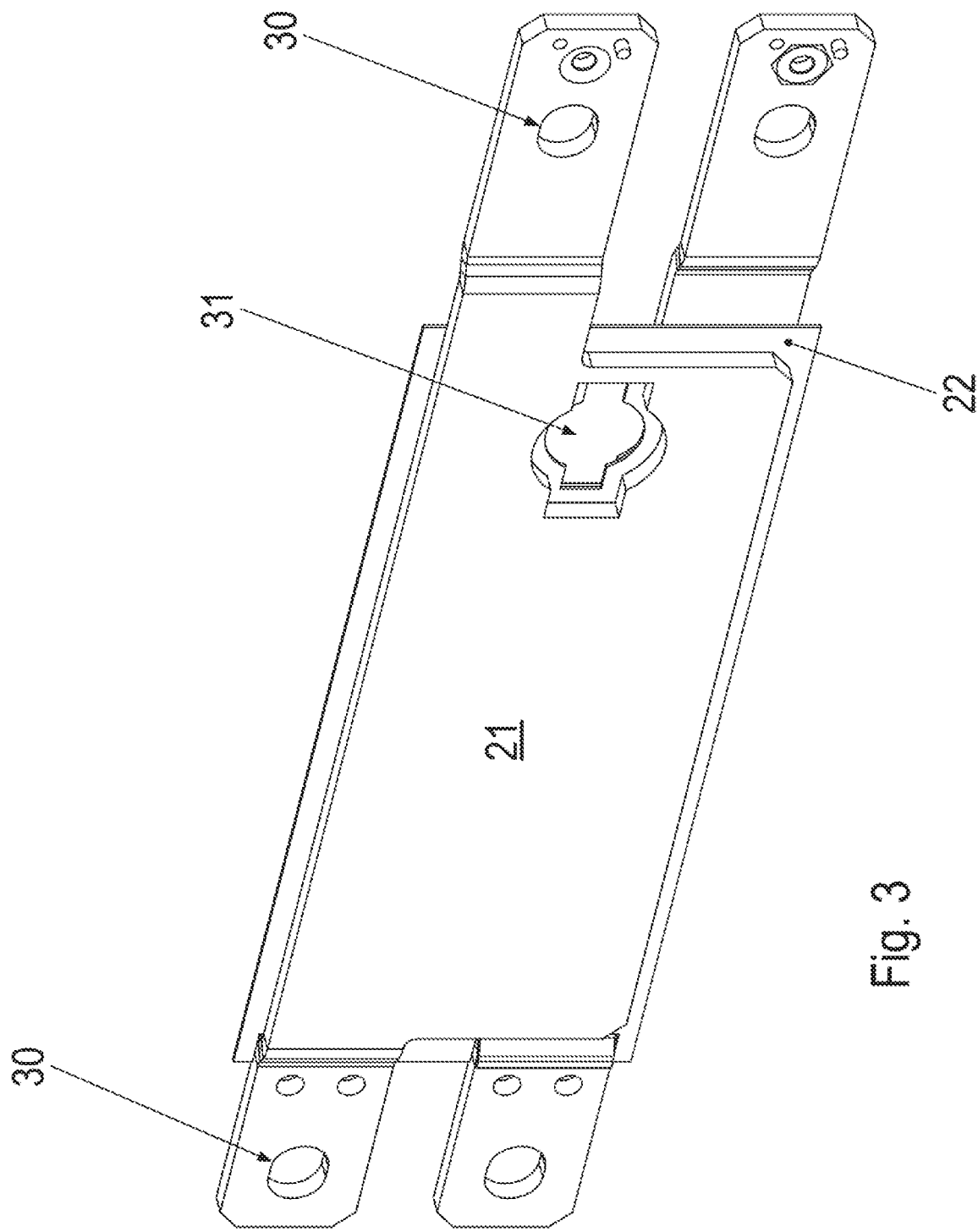
FIG. 3 shows a low-inductance busbar system.

As illustrated in FIG. 3, busbar parts 21 have lug sections, i.e. in particular lug regions, in the front and back in the busbar direction, whose cross-sections are identical in their absolute amounts. As a result, supply module 1 is able to be electrically connected to the first axle module using these busbar parts 21. This is because the absolute current amounts of these two modules that are injected into or removed from the intermediate circuit busbar are identical in their magnitude.

Figure 4:
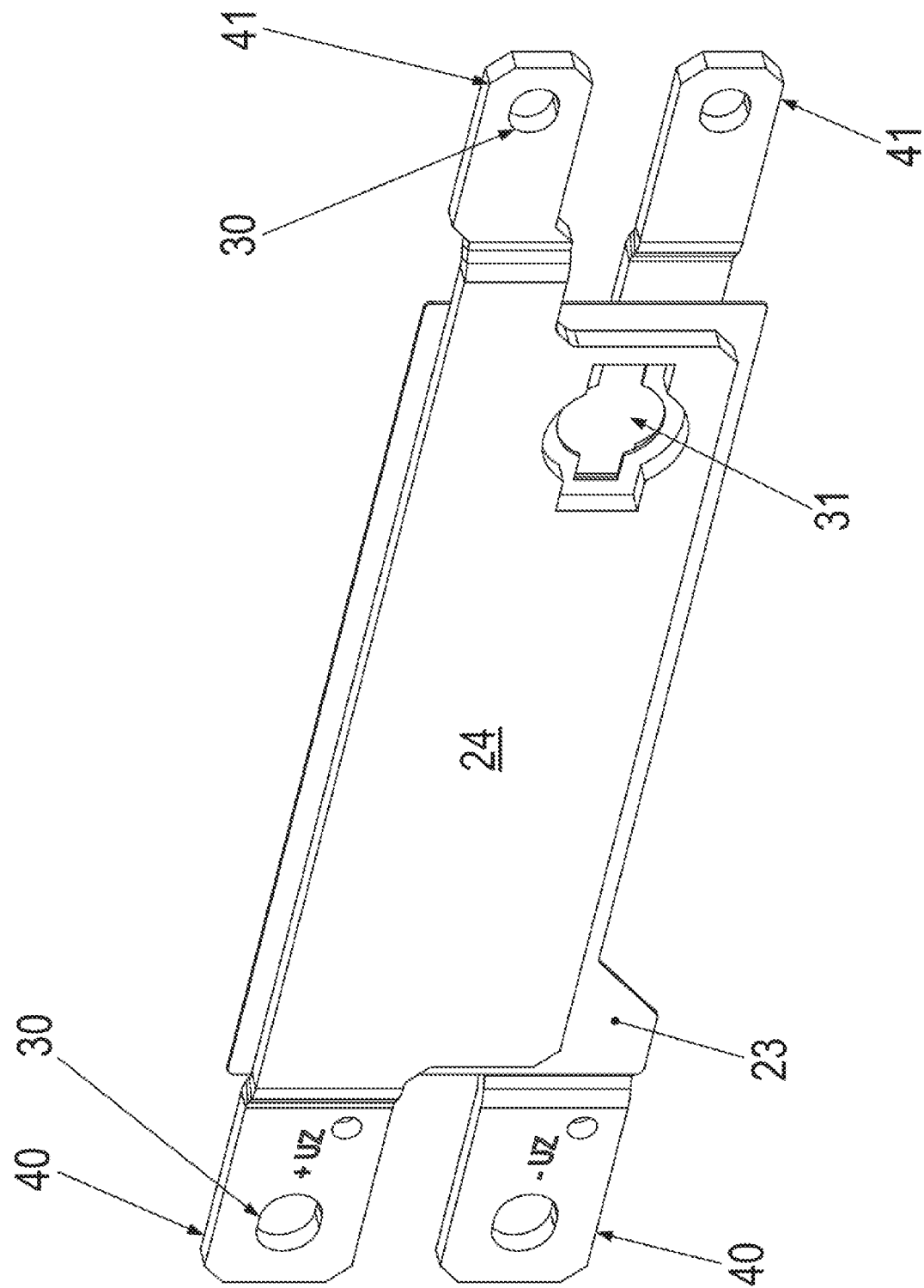
FIG. 4 shows a low-inductance busbar system, which acts as an adapter between a large and a small cross-section of the intermediate circuit busbar.

As illustrated in FIG. 4, busbar adapter parts 24 have a lug section 40 in front in the busbar direction, whose cross-section is greater than the cross-section of a respective lug section 41 formed in back on the respective busbar adapter part 24 in the busbar direction.

Each busbar adapter part 24 is arranged as a punched and bent part, in the same manner as busbar parts 21.

A first busbar adapter part 24 carries the upper intermediate-circuit potential, and the other busbar adapter part 24, which is situated on the other side of the interposed insulation part 23, carries the lower intermediate-circuit potential. The two busbar adapter parts 24 are thus in contact with insulation part 23 which is disposed, i.e. interposed, between them.

Here, the intermediate circuit busbar also has a lower inductance again than in the example embodiment according to FIG. 1 because the clearance between the two busbar adapter parts 24 according to FIG. 4 is smaller, in particular at least ten times or even at least one hundred times smaller than the extension of the respective busbar adapter parts 24 in the transverse direction with respect to the busbar direction.

The transverse direction is not only perpendicular to the bar direction of the busbars, i.e. also to the bar direction of the busbar adapter parts, but also perpendicular to the clearance direction, i.e. the normal of the plate plane of the plate-shaped busbar adapter part.

This therefore allows for a low-inductance intermediate circuit busbar, which has a much larger cross-section for the transmission of current toward the front in the bar direction than toward the back in the bar direction. A correspondingly larger current is therefore able to be introduced by first axle module 2 than by second axle module 3, which is electrically connected to lug section 41 and has a smaller cross-section.

Nevertheless, second axle module 3 is also connected to the intermediate circuit, i.e. especially also to the intermediate circuit busbar, in a low-inductance manner with the aid of busbar adapter part 24 provided in broadened form in the shape of a plate.

The plate-shaped broadening of busbar adapter parts 24 is achieved in that the extension in the transverse direction in the section of busbar adapter part 24, disposed between lug section 40 formed in front and lug section 41 formed in back, is greater in the transverse direction than the extension of the two lug sections (40, 41) in the transverse direction, in particular even greater than the sum of the extensions in the transverse direction of both lug sections 40, 41.

A continuous recess is situated in the region of the busbar adapter parts 24 which is broadened in the form of a plate, and this recess is correspondingly arranged also in insulation part 23. The intermediate circuit busbar thus has a continuous recess as a whole, through which a dome section 20 of a support part projects, the support part being made of plastic and being connected to a housing part of first axle module 2, in particular being attached thereto with the aid of screws.

A cover part may thus be connected to dome section 20 from the direction of the side of the intermediate-circuit busbar that faces away from the housing part, in particular with the aid of screws, so that the intermediate circuit busbar is surroundable in the manner of a housing or surroundable so that it is protected at least from being touched.

Each lug section 40 and 41 also has an uninterrupted recess so that screws are able to be passed through and these lug sections (40, 41) are therefore electrically connectable to the corresponding lug sections of adjacent busbar part 21 in that a respective lug section (40, 41) is able to be connected to a corresponding lug section of a respective busbar part 21 by a screw into the connection region, in that screws that are routed through recesses 31 and are directly or indirectly screwed to the housing part, press the lug sections against each other and exert contact pressure in the direction of the housing part by their screw heads.

LIST OF REFERENCE NUMERALS

1 Supply module
2 First axle module, in particular first power inverter
3 Second axle module, in particular second power inverter
4 First busbar
5 Second busbar
6 Third busbar
7 Fourth busbar
8 Fifth busbar
9 Sixth busbar
20 Dome section of a support part
21 Upper busbar part, in particular busbar plate part
22 Insulation part, in particular insulation plate part
24 Upper busbar adapter part, in particular busbar adapter plate part
23 Insulation part, in particular insulation plate part
30 Continuous recess for connection screw
31 Continuous recess for dome section
40 First lug section
41 Second lug section

The invention claimed is:

1. A drive system, comprising:
an intermediate circuit busbar including at least one first busbar adapter part on which two lug sections are formed that are set apart from each other on opposite sides of the first busbar adapted part;
wherein a first one of the two lug sections has a larger cross-section, line cross-section, and/or current-carrying line cross-section for carrying current than a second one of the two lug sections.

2. The drive system according to claim 1, further comprising a second busbar adapter part on which two lug sections are formed that are set apart from each other, a first one of the two lug sections of the second busbar adapter part having a larger cross-section than a second one of the two lug sections of the second busbar adapter part.

3. The drive system according to claim 2, further comprising electrical insulation arranged between and contacting the first busbar adapter part and the second busbar adapter part, the first busbar adapter part and the second busbar adapter part being set apart from each other.

4. The drive system according to claim 1, wherein each lug section has a continuous recess adapted to receive a connection screw.

5. The drive system according to claim 1, wherein the cross-section, line cross-section, and/or current-carrying line-cross-section is the smallest current-carrying line cross-section.

6. The drive system according to claim 1, further comprising a second busbar adapter part on which two lug sections are formed that are set apart from each other on opposite sides of the second busbar adapter part, a first one of the two lug sections of the second busbar adapter part having a larger cross-section than a second one of the two lug sections of the second busbar adapter part.

7. A drive system, comprising:
an intermediate circuit busbar including at least one first busbar adapter part on which two lug sections are formed that are set apart from each other; and
a second busbar adapter part on which two lug sections are formed that are set apart from each other, a first one of the two lug sections of the second busbar adapter part having a larger cross-section than a second one of the two lug sections of the second busbar adapter part;
wherein a first one of the two lug sections of the first busbar adapter part has a larger cross-section, line cross-section, and/or current-carrying line cross-section for carrying current than a second one of the two lug sections of the first busbar adapter part; and
wherein the first busbar adapter part and/or the second busbar adapter part are plate-shaped, a clearance between the first busbar adapter part and the second busbar adapter part being less than a longitudinal dimension of the busbar adapter parts.

8. The drive system according to claim 7, wherein the clearance between the first busbar adapter part and the second busbar adapter part is at least ten times less than the extension in the transverse direction.

9. The drive system according to claim 7, wherein the clearance between the first busbar adapter part and the second busbar adapter part is at least one hundred times less than the extension in the transverse direction.

10. A drive system, comprising:
an intermediate circuit busbar including at least one first busbar adapter part on which two lug sections are formed that are set apart from each other;
a second busbar adapter part on which two lug sections are formed that are set apart from each other, a first one of the two lug sections of the second busbar adapter part having a larger cross-section than a second one of the two lug sections of the second busbar adapter part; and
electrical insulation arranged between and contacting the first busbar adapter part and the second busbar adapter part, the first busbar adapter part and the second busbar adapter part being set apart from each other
wherein a first one of the two lug sections of the first busbar adapter part has a larger cross-section, line cross-section, and/or current-carrying line cross-section for carrying current than a second one of the two lug sections of the first busbar adapter part; and wherein the intermediate circuit busbar, including the insulation and each busbar adapter part, includes a continuous recess adapted to receive a dome section of a support part connected to a housing part of the drive system and/or to a housing part of an axle module of the drive system, a cover part, arranged on a side of the intermediate circuit busbar facing away from the housing part, being connected to the dome section.

11. A drive system, comprising:
an intermediate circuit busbar including at least one first busbar adapter part on which two lug sections are formed that are set apart from each other; and
a supply module, a first axle module, and a second axle module, the intermediate circuit busbar adapted to supply current from the supply module to the axle modules, the first axle module being connected to the intermediate circuit busbar by a first electrical line, the second axle module being connected to the intermediate circuit busbar by a second electrical line, the first electrical line having a larger line cross-section than the second electrical line;
wherein a first one of the two lug sections has a larger cross-section, line cross-section, and/or current-carrying line cross-section for carrying current than a second one of the two lug sections.

12. The drive system according to claim 11, wherein the supply module includes a power rectifier and/or AC/DC converter having a DC-side terminal connected to the intermediate circuit busbar, the first axle module having a first power inverter, the second axle module having a second power inverter.

13. The drive system according to claim 12, wherein the first power inverter has a higher maximum output than the second power inverter.

14. The drive system according to claim 11, wherein the intermediate circuit busbar includes busbars adapted to electrically connect the supply module to the first axle module, and lug sections, which are set apart from one another, being formed on each one of the busbars, each lug section having the same cross-section, line cross-section, and/or current-carrying line cross-section.

15. The drive system according to claim 11, wherein at least one of the axle modules includes energy feedback capability, electrical power being conveyable to the supply module and/or to another axle module by the intermediate circuit busbar during a generator operation of an electric motor supplied by the respective power inverter.

* * * * *